United States Patent
Wang et al.

(10) Patent No.: US 10,879,660 B1
(45) Date of Patent: Dec. 29, 2020

(54) ASYMMETRIC HIGH-SPEED INTERCONNECT ROUTING INTERPOSER

(71) Applicant: DELL PRODUCTS, LP, Round Rock, TX (US)

(72) Inventors: Isaac Qin Wang, Austin, TX (US); Jing Zhang, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/523,091

(22) Filed: Jul. 26, 2019

(51) Int. Cl.
*H01R 33/945* (2006.01)
*G06F 13/40* (2006.01)

(52) U.S. Cl.
CPC ....... *H01R 33/945* (2013.01); *G06F 13/4009* (2013.01); *G06F 13/4027* (2013.01)

(58) Field of Classification Search
CPC ............... H01R 33/945; G06F 13/4027; G06F 13/4009
See application file for complete search history.

(56) References Cited

U.S. PATENT DOCUMENTS

| | | | |
|---|---|---|---|
| 5,987,623 A | * | 11/1999 | Ushida ............... G11C 29/883 714/6.1 |
| 6,101,624 A | | 4/2000 | Cheng et al. |
| 7,265,579 B2 | | 9/2007 | Carlson et al. |
| 7,526,535 B2 | | 4/2009 | Peck et al. |
| 8,595,671 B2 | | 11/2013 | He |
| 10,116,557 B2 | | 10/2018 | Gray |
| 2003/0223295 A1 | | 12/2003 | Ozguz et al. |

* cited by examiner

*Primary Examiner* — Idriss N Alrobaye
*Assistant Examiner* — Ronald T Modo
(74) *Attorney, Agent, or Firm* — Larson Newman, LLP (57) ABSTRACT

An information handling system includes a first device having a first data communication interface connected to a first socket area of a socket. A second device includes a second data communication interface connected to a second socket area of the socket. A host processor includes a third data communication interface connected to a third socket area of the socket. When an interposer is installed into the socket in a first orientation, the interposer connects the first data communication interface to the third data communication interface. When the interposer is installed into the socket in a second orientation, the interposer connects the first data communication interface to the second data communication interface.

19 Claims, 5 Drawing Sheets

ASYMMETRIC HIGH-SPEED INTERCONNECT ROUTING INTERPOSER

FIELD OF THE DISCLOSURE

The present disclosure generally relates to information handling systems, and more particularly relates to an asymmetric high-speed interconnect routing interposer.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may include a socket affixed to a printed circuit board of the information handling system, first and second devices, a host processor, and an interposer. The first device may include a first data communication interface connected to a first socket area of the socket. The second device may include a second data communication interface connected to a second socket area of the socket. The host processor may include a third data communication interface connected to a third socket area of the socket. When the interposer is installed into the socket in a first orientation, the interposer may connect the first data communication interface to the third data communication interface. When the interposer is installed into the socket in a second orientation, the interposer may connect the first data communication interface to the second data communication interface.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
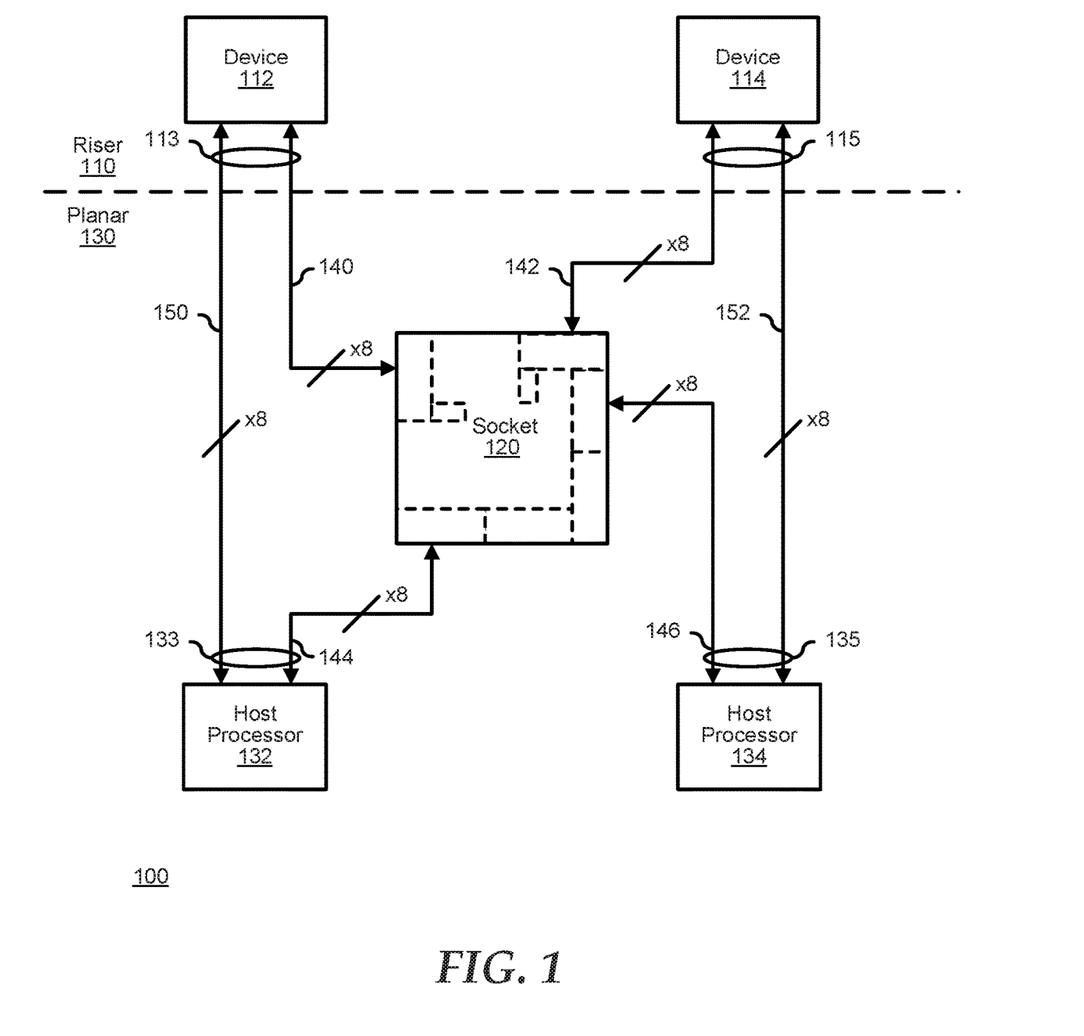
FIG. 1 is a block diagram of a portion of an information handling system according to at least one embodiment of the disclosure.

FIG. 1 shows a portion of an information handling system 100 including a riser portion 110 and a planar portion 130. Within riser portion 110, information handling system 100 includes devices 112 and 114. Within planar portion 130, information handling system 100 includes a connectivity socket 120 and host processors 132 and 134. Information handling system 100 may include additional components (not shown in FIG. 1), without varying from the scope of this disclosure. One of ordinary skill in the art will recognize that while FIG. 1 illustrates devices 112 and 114 and processors 132 and 134, this disclosure is not limited to two devices, two processors, or a single connectivity socket, but can be applied to any number of devices, processors, and connectivity sockets. In an embodiment, devices 112 and 114 may be any suitable device type using any suitable communication protocol including, but not limited to, a Peripheral Component Interconnect Express (PCIe) device, a field programmable gate array (FPGA) device, a Gen-Z device, an OpenCAPI device, and cache coherent interconnect for accelerators (CCIX) device, a General-purpose Processing Unit (GPU), a network interface device, or the like. It will be understood that, while socket 120 is illustrated as being included in planar portion 130, this is not necessarily so, and a socket as described herein may be placed in riser portion 110, or elsewhere, as needed or desired.

Figure 2:
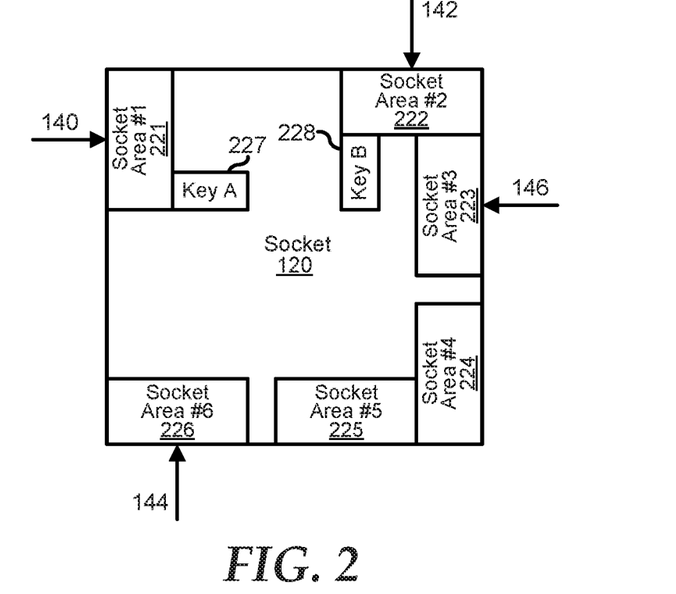
FIG. 2 is a diagram of a socket of the information handling system of FIG. 1.

Socket 120, illustrated in FIG. 2 below, represents a first half of a passive connector device that provides connectivity between devices 112 and 114, and host processors 132 and 134. How devices 112 and 114, and processors 132 and 134 are interconnected is determined based upon how an interposer 300, illustrated in FIG. 3 below, is installed into socket 120. Thus interposer 300 represents a second half of the passive connector device. When interposer 300 is installed into socket 120 in a first orientation, device 112 is connected to host processor 132 via a single 16-bit data communication interface, and device 114 is connected to host processor 134 via a single 16-bit data communication interface. When interposer 300 is installed into socket 120 in a second orientation, device 112 is connected to host processor 132 via an 8-bit data communication interface, device 114 is connected to host processor 134 via an 8-bit data communication interface, and device 112 is connected to device 114 via an 8-bit communication interface.

Socket 120 is soldered onto a printed circuit board of planar portion 130, such that an 8-bit data communication interface 140 (a first half of 16-bit data communication interface 113) is connected between the socket and device 112, an 8-bit data communication interface 142 (a first half of 16-bit data communication interface 115) is connected between the socket and device 114 an 8-bit data communication interface 144 (a first half of 16-bit data communication interface 133) is connected between the socket and host processor 132, and an 8-bit data communication interface 146 (a first half of 16-bit data communication interface 135) is connected between the socket and host processor 134. As shown in FIG. 2, socket 120 includes six socket areas 221, 222, 223, 224, 225, and 226, and two key ways 227 and 228.

Figure 3:
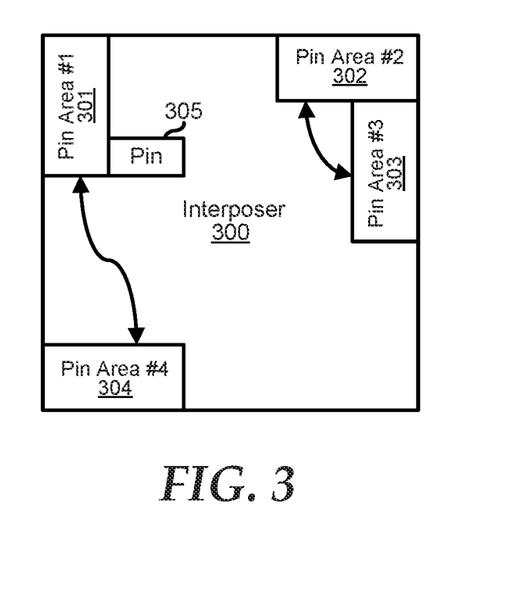
FIG. 3 is a diagram of an interposer for the information handling system of FIG. 1.

As shown in FIG. 3, interposer 300 includes four pin areas 301, 302, 303, and 304, and a pin key area 305. Interposer 300 provides a first 8-bit data communication interface circuit path between pin area 301 and pin area 304, and a second 8-bit data communication interface circuit path between pin area 302 and pin area 303. Thus socket areas 221-226 each represent arrays of circuit connector halves of a first type to which mating circuit connector halves of a second type of selected pin areas 301-304 are mated to form circuit connections.

For example, socket 120 and interposer 300 may make up a pin-and-barrel type connector, where socket areas 221-226 represent connector barrels and pin areas 301-304 represent mated pins that are inserted into the barrels of the socket areas. In another example, socket 120 and interposer 300 may make up a bump-and-pad type connector, where socket areas 221-226 represent connector pads and pin areas 301-304 represent mated bumps that are set atop the pads of the socket areas. Other mating connector types may be utilized as needed or desired. Moreover, the roles of socket 120 and interposer 300 in a pin-and-barrel type connector may be reversed. However, where such roles are reversed, for example where the socket represents arrays of pins, it will be understood that the socket will include four pin areas and the associated interposer will include six socket areas. Similar considerations apply for the roles of socket 120 and interposer 300 in a bump-and-pad type connector.

Socket 120 includes key ways 227 and 228 that are each oriented in such a way that mating key 305 of interposer 300 interacts to ensure that the interposer is only installed into the socket in one of two predetermined ways. For example, key ways 227 and 228 may represent barrels that restrict the orientation of interposer 300 by permitting key 305, in the form of a pin, to be inserted into only one of the key ways. In another example, key ways 227 and 228 and key 305 represent a slot-and-tab type key arrangement where key 305 represents a tab on an edge of interposer 300, and the key ways represent slots that restrict the installation of the interposer in only one of two orientations.

Returning to FIG. 1, devices 112 and 114, and host processors 132 and 134 are each illustrated as having a data communication interface that is 16-bits wide. Device 112 includes a 16-bit data communication interface 113. 8-bits of data communication interface 113 are shown as an 8-bit data communication interface 150 that is connected directly to host processor 132, and 8-bits of data communication interface 113 are shown as an 8-bit data communication interface 140 that is connected to socket 120. Device 114 includes a 16-bit data communication interface 115. 8-bits of data communication interface 115 are shown as an 8-bit data communication interface 152 that is connected directly to host processor 134, and 8-bits of data communication interface 115 are shown as an 8-bit data communication interface 142 that is connected to socket 120. Host processor 132 includes a 16-bit data communication interface 133. 8-bits of data communication interface 133 are shown as 8-bit data communication interface 150 that is connected directly to device 112, and 8-bits of data communication interface 133 are shown as an 8-bit data communication interface 144 that is connected to socket 120. Finally, host processor 134 includes a 16-bit data communication interface 135. 8-bits of data communication interface 135 are shown as 8-bit data communication interface 155 that is connected directly to device 114, and 8-bits of data communication interface 135 are shown as an 8-bit data communication interface 146 that is connected to socket 120.

Figure 4:
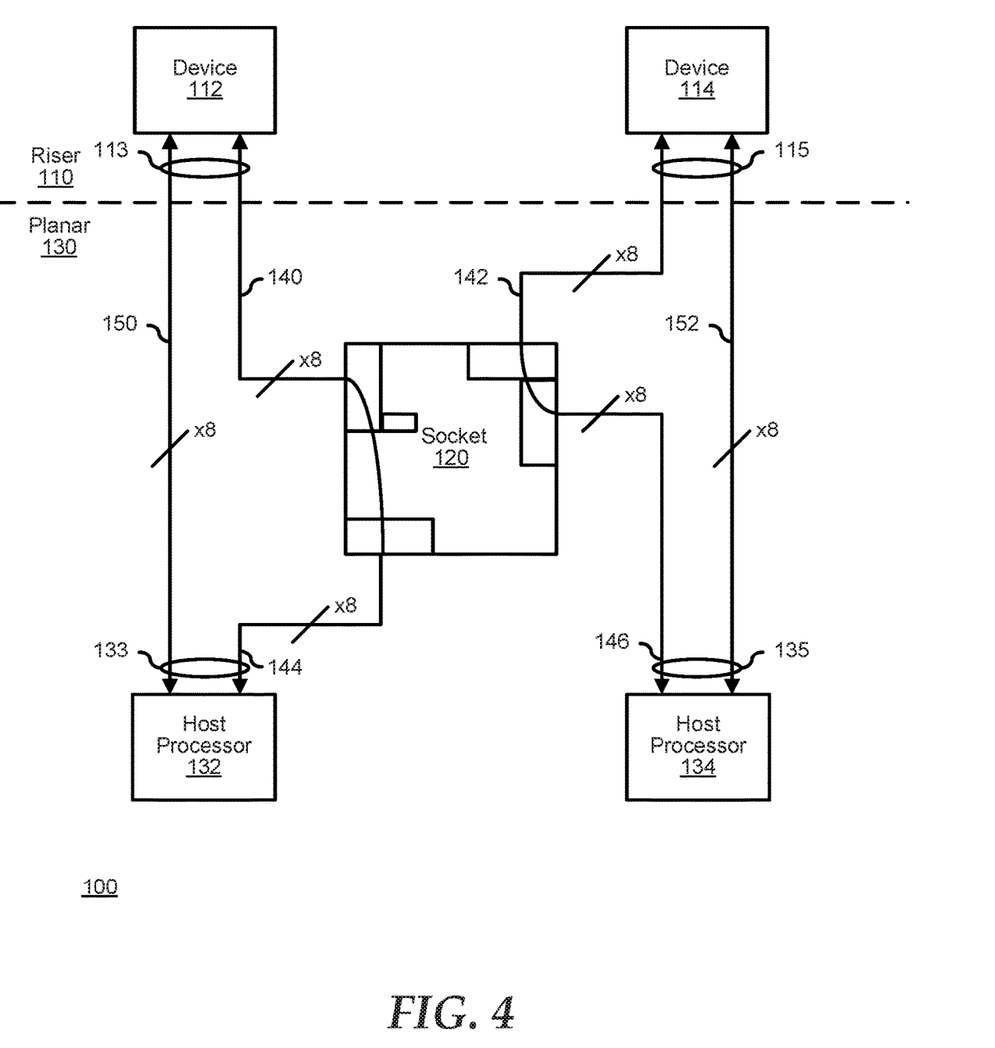
FIGS. 4 and 5 are block diagrams of usage cases of the information handling system of FIG. 1.

Data communication interfaces 113, 115, 133, and 135 are each operable as a single 16-bit data communication interface, or are bifurcatable to operate as two 8-bit data communication interfaces. For example, when interposer 300 is installed into socket 120 in a first orientation, as shown in FIG. 4, pin key pad 305 mates with key pad 227, and data communication interfaces 113, 115, 133, and 135 are each operated as 16-bit data communication interfaces. Here interposer 300 operates to connect 8-bit data communication interface 140 to 8-bit data communication interface 144 and to connect 8-bit data communication interface 142 to 8-bit data communication interface 146. In this way, device 112 is connected to host processor 132 via two 8-bit data communication interfaces (140/144 and 150), and device 114 is connected to host processor 134 via two 8-bit data communication interfaces (142/146 and 152).

Figure 5:
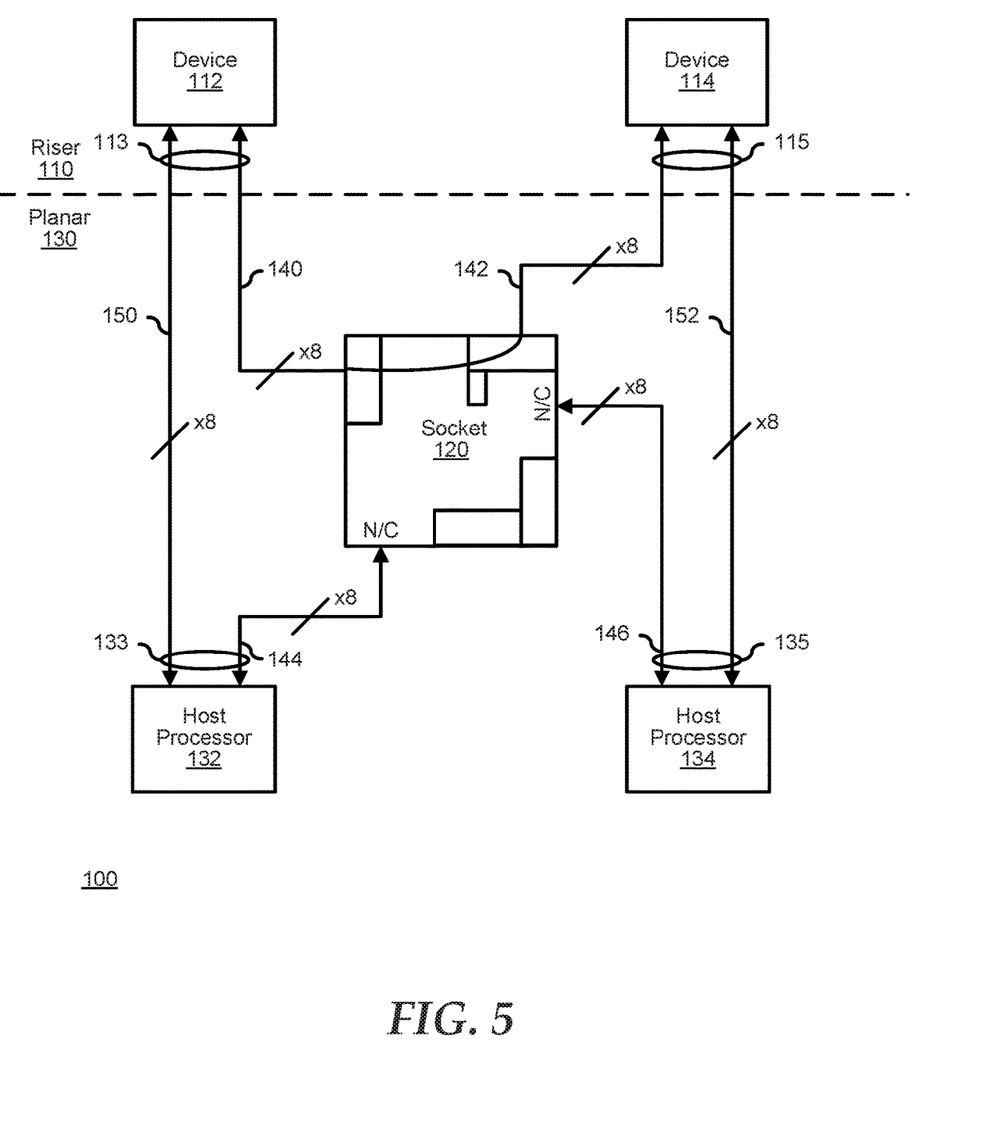

In another example, when interposer 300 is installed into socket 120 in a second orientation, as shown in FIG. 5, pin key pad 305 mates with key pad 228. Here data communication interfaces 113 and 115 are each bifurcated as two separate 8-bit data communication interfaces. Here 8-bit data communication interfaces 150 and 152 remain to connect devices 112 and 114 to respective host processors 132 and 134, and interposer 300 operates to connect 8-bit data communication interface 140 to 8-bit data communication interface 142, and 8-bit data communication interfaces 144 and 146 are not connected. In this way, device 112 is connected to device 114 via a single 8-bit data communication interfaces (140/142), device 112 is connected to host processor 132 via a single 8-bit data communication interfaces (150), and device 114 is connected to host processor 134 via a single 8-bit data communication interfaces (152).

As illustrated in FIGS. 1, 4, and 5, the data communication interfaces are all represented as 8-bit/16-bit data communication interfaces, but this is not necessarily so, and other widths of data communication interfaces are possible, such as 2-bit data communication interfaces, 4-bit data communication interfaces, or another width, as needed or desired. Further it is not necessary to the teachings of the present disclosure that the widths of the various data communication interfaces are equal to each other. For example, data communication interfaces 150 and 152 may be a 4-bit data communication interface, and the mating pair of socket 120 and interposer 300 may operate to redirect 12-bit data communication interfaces between devices 112 and 114, and host processors 132 and 134. Other combinations of widths may be utilized as needed or desired.

The number and arrangement of the mating connector halves as implemented by socket 120 and interposer 300 will vary depending upon the nature of the data communication interfaces that are provided between devices 112 and 114, and host processors 132 and 134. For example, when the data communication interfaces represent a single-ended circuit topology, each signal of the data communication interface may represent one connector and some specified number of associated ground connectors, or, when the data communication interfaces represent a differential circuit topology, each signal of the data communication interface may represent two connector (S+ and S−). The number of mating connector halves in the socket and pin areas will therefore be understood to vary accordingly.

The placements of the socket areas of socket 120 and pin areas of interposer 300, as described herein, are for shown for the purposes of illustrating the present embodiments, and the placements of socket areas and pin areas may differ as needed or desired. For example, while the socket areas of socket 120 and pin areas of interposer 300, as illustrated herein, are shown as taking up only a small portion of the area of the socket and interposer. It will therefore be understood that it is desirable for the area of a PCB taken up by a socket to be as small as possible. Therefore the arrangement of the socket and pin areas may be arranged to more efficiently utilize the area of the respective socket and interposer, as needed or desired. Finally, the fixed data communication interfaces between devices 112 and 114, and host processors 132 and 134, are illustrated as being routed directly between the respective devices, but this is not necessarily so, and a socket and interposer pair may be designed to route the fixed data communication interfaces, as needed or desired.

Figure 6:
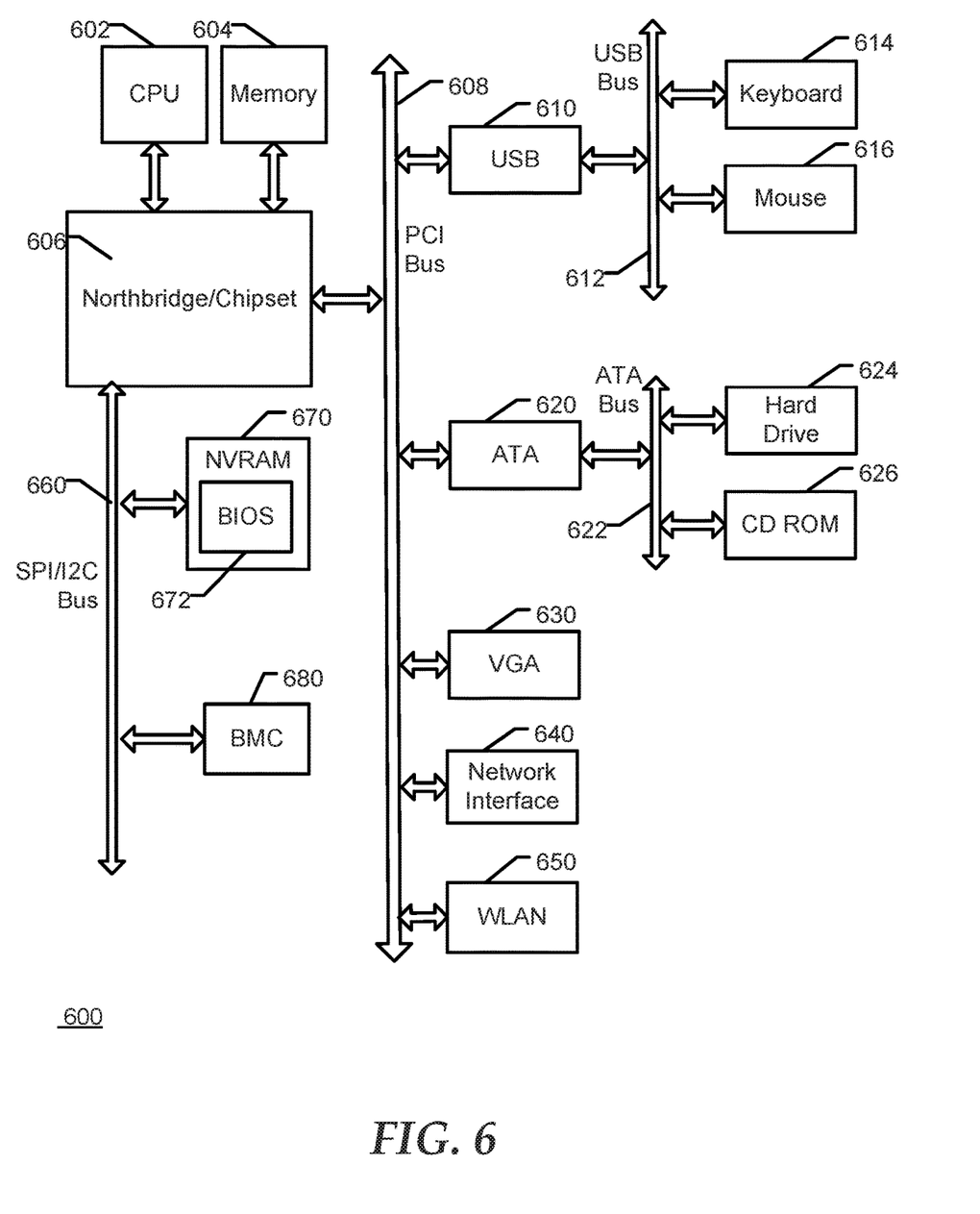
FIG. 6 is a block diagram of a general information handling system according to at least one embodiment of the disclosure.

FIG. 6 illustrates a general information handling system 600 including a processor 602, a memory 604, a northbridge/chipset 606, a PCI bus 608, a universal serial bus (USB) controller 610, a USB 612, a keyboard device controller 614, a mouse device controller 616, a configuration an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a NVRAM 670 for storing BIOS 672, and a baseboard management controller (BMC) 680. BMC 680 can be referred to as a service processor or embedded controller (EC). Capabilities and functions provided by BMC 680 can vary considerably based on the type of information handling system. For example, the term baseboard management system is often used to describe an embedded processor included at a server, while an embedded controller is more likely to be found in a consumer-level device. As disclosed herein, BMC 680 represents a processing device different from CPU 602, which provides various management functions for information handling system 600. For example, an embedded controller may be responsible for power management, cooling management, and the like. An embedded controller included at a data storage system can be referred to as a storage enclosure processor.

For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as CPU 602, a programmable logic array (PLA), an embedded device such as a System-on-a-Chip (SoC), or other control logic hardware. Information handling system 600 can also include one or more computer-readable medium for storing machine-executable code, such as software or data.

System 600 can include additional processors that are configured to provide localized or specific control functions, such as a battery management controller. Bus 660 can include one or more busses, including a SPI bus, an I2C bus, a system management bus (SMBUS), a power management bus (PMBUS), and the like. BMC 680 can be configured to provide out-of-band access to devices at information handling system 600. As used herein, out-of-band access herein refers to operations performed prior to execution of BIOS 672 by processor 602 to initialize operation of system 600.

BIOS 672 can be referred to as a firmware image, and the term BIOS is herein used interchangeably with the term firmware image, or simply firmware. BIOS 672 includes instructions executable by CPU 602 to initialize and test the hardware components of system 600, and to load a boot loader or an operating system (OS) from a mass storage device. BIOS 672 additionally provides an abstraction layer for the hardware, such as a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

Information handling system 600 can include additional components and additional busses, not shown for clarity. For example, system 600 can include multiple processor cores, audio devices, and the like. While a particular arrangement of bus technologies and interconnections is illustrated for the purpose of example, one of ordinary skill in the art will appreciate that the techniques disclosed herein are applicable to other system architectures. System 600 can include multiple CPUs and redundant bus controllers. One or more components can be integrated together. For example, portions of northbridge/chipset 606 can be integrated within CPU 602. Additional components of information handling system 600 can include one or more storage devices that can store machine-executable code, one or more communications ports for communicating with external devices, and various input and output (I/O) devices, such as a keyboard, a mouse, and a video display. For example, device controller 630 may provide data to a display device to visually present the information to an individual associated with information handling system 600. An example of information handling system 600 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 600 can include a set of instructions that can be executed to cause the information handling system to perform any one or more of the methods or computer based functions disclosed herein. The information handling system 600 may operate as a standalone device or may be connected to other computer systems or peripheral devices, such as by a network.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The information handling system 600 can include a disk drive unit and may include a computer-readable medium, not shown in FIG. 6, in which one or more sets of instructions, such as software, can be embedded. Further, the instructions may embody one or more of the methods or logic as described herein. In a particular embodiment, the instructions may reside completely, or at least partially, within system memory 604 or another memory included at system 600, and/or within the processor 602 during execution by the information handling system 600. The system memory 604 and the processor 602 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a socket affixed to a printed circuit board of the information handling system;
   a first device including a first data communication interface connected to a first socket area of the socket;
   a second device including a second data communication interface connected to a second socket area of the socket;
   a first host processor including a third data communication interface connected to a third socket area of the socket; and
   an interposer that, when installed into the socket in a first orientation, connects the first data communication interface to the third data communication interface, and when installed into the socket in a second orientation, connects the first data communication interface to the second data communication interface.

2. The information handling system of claim 1, further comprising:
   a second host processor including a fourth data communication interface connected to a fourth socket area of the socket, wherein, when the interposer is installed into the socket in the first orientation, the interposer connects the second data communication interface to the fourth data communication interface.

3. The information handling system of claim 2, wherein, when the interposer is installed into the socket in the second orientation, the second and fourth data communication interfaces are not connected to any device of the information handling system.

4. The information handling system of claim 2, wherein:
the first device further includes a fifth data communication interface connected to the first host processor; and
the second device further includes a sixth data communication interface connected to the second host processor.

5. The information handling system of claim 4, wherein the fifth and sixth data communication interfaces are routed via the socket when the interposer is installed into the socket in both the first and second orientations.

6. The information handling system of claim 1, wherein:
the socket includes a first key way and a second key way; and
the interposer includes a key that interfaces with the first key way when the interposer is installed into the socket in the first orientation, and that interfaces with the second key way when the interposer is installed into the socket in the second orientation.

7. The information handling system of claim 6, wherein the first and second key ways include first and second barrels, and the key includes a pin.

8. The information handling system of claim 6, wherein the first and second key ways include first and second slots, and the key includes a tab.

9. The information handling system of claim 1, wherein the socket and the interposer include mating circuit connector halves of a pin-and-barrel type connector.

10. The information handling system of claim 1, wherein the socket and the interposer include mating circuit connector halves of a bump-and-pad type connector.

11. A method, comprising:
affixing a socket to a printed circuit board of an information handling system;
connecting a first data communication interface of a first device to a first socket area of the socket;
connecting a second data communication interface of a second device to a second socket area of the socket;
connecting a third data communication interface of a first host processor to a third socket area of the socket;
installing, into the socket, an interposer in a first orientation, wherein when installed into the socket in the first orientation, the interposer connects the first data communication interface to the third data communication interface; and
installing, into the socket, the interposer in a second orientation, wherein, when installed into the socket in the second orientation, the interposer connects the first data communication interface to the second data communication interface.

12. The method of claim 11, further comprising:
connecting a fourth data communication interface of a second host processor to a fourth socket area of the socket, wherein, when the interposer is installed into the socket in the first orientation, the interposer connects the second data communication interface to the fourth data communication interface.

13. The method of claim 12, wherein, when the interposer is installed into the socket in the second orientation, the third and fourth data communication interfaces are not connected to any device of the information handling system.

14. The method of claim 12, wherein:
the first device further includes a fifth data communication interface connected to the first host processor; and
the second device further includes a sixth data communication interface connected to the second host processor.

15. The method of claim 14, wherein the fifth and sixth data communication interfaces are routed via the socket when the interposer is installed into the socket in both the first and second orientations.

16. The method of claim 11, wherein:
the socket includes a first key way and a second key way; and
the interposer includes a key that interfaces with the first key way when the interposer is installed into the socket in the first orientation, and that interfaces with the second key way when the interposer is installed into the socket in the second orientation.

17. The method of claim 16, wherein the first and second key ways include first and second barrels, and the key includes a pin.

18. The method of claim 16, wherein the first and second key ways include first and second slots, and the key includes a tab.

19. The method of claim 11, wherein the socket and the interposer include mating circuit connector halves of a pin-and-barrel type connector or of a bump-and-pad type connector.

* * * * *